(12) United States Patent
McCloskey et al.

(10) Patent No.: US 10,366,107 B2
(45) Date of Patent: Jul. 30, 2019

(54) CATEGORIZING QUESTIONS IN A QUESTION ANSWERING SYSTEM

(71) Applicant: International Business Machines Corporation, Armonk, NY (US)

(72) Inventors: Daniel J. McCloskey, Dublin (IE); William G. O'Keeffe, Tewksbury, MA (US); Timothy V. Paciolla, Austin, TX (US); Cale R. Vardy, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 14/615,731

(22) Filed: Feb. 6, 2015

(65) Prior Publication Data

US 2016/0232221 A1     Aug. 11, 2016

(51) Int. Cl.
  *G06F 17/30* (2006.01)
  *G06F 16/28* (2019.01)
  *G06F 16/93* (2019.01)
  *G06N 5/04* (2006.01)

(52) U.S. Cl.
  CPC ............ *G06F 16/285* (2019.01); *G06F 16/93* (2019.01); *G06N 5/04* (2013.01)

(58) Field of Classification Search
  None
  See application file for complete search history.

(56) References Cited

U.S. PATENT DOCUMENTS

| | | | |
|---|---|---|---|
| 5,442,778 A | 8/1995 | Pedersen et al. | |
| 5,519,608 A | 5/1996 | Kupiec | |
| 6,665,841 B1 | 12/2003 | Mahoney et al. | |
| 6,901,394 B2 | 5/2005 | Chauhan et al. | |
| 7,269,545 B2 | 9/2007 | Agichtein | |
| 7,349,899 B2 * | 3/2008 | Namba | G06F 17/3071 |
| 7,844,598 B2 | 11/2010 | Masuichi et al. | |
| 7,873,624 B2 | 1/2011 | Agichtein | |
| 8,055,675 B2 | 11/2011 | Higgins et al. | |
| 8,145,623 B1 * | 3/2012 | Mehta | G06F 17/3064 |
| | | | 707/713 |
| 8,346,701 B2 | 1/2013 | Wang | |
| 8,463,791 B1 | 6/2013 | Bierner et al. | |
| 8,601,030 B2 | 12/2013 | Bagchi et al. | |
| 8,666,983 B2 | 3/2014 | Brill et al. | |

(Continued)

OTHER PUBLICATIONS

List of IBM Patents or Patent Applications Treated as Related (Appendix P), 2 pages.

(Continued)

*Primary Examiner* — Anhtai V Tran
(74) *Attorney, Agent, or Firm* — Stephen J. Walder, Jr.; William H. Hartwell

(57) ABSTRACT

A mechanism is provided in a question answering system for categorizing questions. The mechanism clusters documents from a corpus of documents to form a nested structure of clusters of documents. The mechanism records questions answered by question answering system in a database in association with answers returned and answer confidence values. The mechanism maps the questions to the nested structure of clusters of documents to form a nested structure of clusters of questions. The mechanism presents recommended questions based on the nested structure of clusters of questions in a user interface of the question answering system.

14 Claims, 6 Drawing Sheets

(56) References Cited

U.S. PATENT DOCUMENTS

| | | |
|---|---|---|
| 8,682,913 B1 | 3/2014 | Betz |
| 8,732,204 B2 | 5/2014 | Chua et al. |
| 8,768,782 B1 | 7/2014 | Myslinski |
| 8,832,064 B2 | 9/2014 | Stenchikova |
| 8,886,157 B2 | 11/2014 | Hawkes |
| 9,213,748 B1 | 12/2015 | Matias |
| 9,582,757 B1 | 2/2017 | Holmes |
| 9,703,860 B2 | 7/2017 | Berajawala et al. |
| 9,727,637 B2 | 8/2017 | Visotski |
| 9,753,986 B2 | 9/2017 | Dubbels |
| 9,817,872 B2 | 11/2017 | Pamu |
| 2002/0029232 A1 | 3/2002 | Bobrow et al. |
| 2002/0169595 A1 | 11/2002 | Agichtein |
| 2002/0194164 A1 | 12/2002 | Morrow et al. |
| 2004/0254917 A1 | 12/2004 | Brill et al. |
| 2005/0188330 A1 | 8/2005 | Griffin |
| 2005/0266387 A1 | 12/2005 | Rossides |
| 2006/0112036 A1 | 5/2006 | Zhang |
| 2007/0094285 A1 | 4/2007 | Agichtein |
| 2007/0219794 A1 | 9/2007 | Park et al. |
| 2009/0287678 A1 | 11/2009 | Brown et al. |
| 2009/0299746 A1 | 12/2009 | Meng et al. |
| 2009/0306967 A1 | 12/2009 | Nicolov |
| 2010/0030769 A1* | 2/2010 | Cao ............... G06F 17/30696 707/738 |
| 2010/0076998 A1 | 3/2010 | Podgorny et al. |
| 2010/0138216 A1 | 6/2010 | Tanev |
| 2010/0191686 A1 | 7/2010 | Wang |
| 2010/0302281 A1 | 12/2010 | Kim |
| 2010/0317408 A1 | 12/2010 | Ferren |
| 2011/0029351 A1 | 2/2011 | Intemann et al. |
| 2011/0066587 A1 | 3/2011 | Ferrucci et al. |
| 2011/0087686 A1* | 4/2011 | Brewer ............... G06F 17/3064 707/766 |
| 2011/0125734 A1 | 5/2011 | Duboue et al. |
| 2012/0078889 A1 | 3/2012 | Chu-Carroll |
| 2012/0078891 A1 | 3/2012 | Brown et al. |
| 2012/0209847 A1 | 8/2012 | Rangan |
| 2012/0288844 A1 | 11/2012 | Anand |
| 2012/0301864 A1 | 11/2012 | Bagchi et al. |
| 2013/0007055 A1 | 1/2013 | Brown et al. |
| 2013/0017523 A1 | 1/2013 | Barborak et al. |
| 2013/0018652 A1 | 1/2013 | Ferrucci et al. |
| 2013/0066886 A1* | 3/2013 | Bagchi ............... G06F 17/30654 707/749 |
| 2013/0117257 A1 | 5/2013 | Meijer |
| 2013/0297545 A1 | 11/2013 | Bierner et al. |
| 2013/0304730 A1 | 11/2013 | Zhou |
| 2013/0304758 A1 | 11/2013 | Gruber |
| 2013/0311476 A1 | 11/2013 | Bierner |
| 2014/0040181 A1 | 2/2014 | Kuznetsov |
| 2014/0046947 A1 | 2/2014 | Jenkins |
| 2014/0114986 A1 | 4/2014 | Bierner et al. |
| 2014/0172883 A1 | 6/2014 | Clark et al. |
| 2014/0181204 A1 | 6/2014 | Sharp et al. |
| 2014/0222822 A1 | 8/2014 | Jenkins et al. |
| 2014/0229293 A1 | 8/2014 | Huang et al. |
| 2014/0279996 A1 | 9/2014 | Teevan et al. |
| 2014/0280169 A1* | 9/2014 | Liu ............... G06F 17/30598 707/739 |
| 2014/0298199 A1 | 10/2014 | Johnson, Jr. et al. |
| 2014/0316856 A1 | 10/2014 | Williams et al. |
| 2015/0026163 A1 | 1/2015 | Haggar |
| 2015/0235131 A1 | 8/2015 | Allen et al. |
| 2016/0034457 A1 | 2/2016 | Bradley |
| 2016/0048514 A1 | 2/2016 | Allen |
| 2016/0048516 A1 | 2/2016 | Guiliano |
| 2016/0098444 A1 | 4/2016 | Berajawala et al. |
| 2016/0098737 A1 | 4/2016 | Berajawala et al. |
| 2016/0232222 A1 | 8/2016 | McCloskey et al. |
| 2016/0283581 A1 | 9/2016 | Berajawala et al. |

OTHER PUBLICATIONS

Amaral, Carlos et al., "Priberam's Question Answering System in QA", CLEF, Sep. 19-21, 2007, 7 pages.

Cao, Xin et al., "The Use of Categorization Information in Language Models for Question Retrieval", CIKM '09, Proceedings of the 18th ACM Conference on Information and Knowledge Management, Nov. 2-6, 2009, 10 pages.

High, Rob, "The Era of Cognitive Systems: An Inside Look at IBM Watson and How it Works", IBM Corporation, Redbooks, Dec. 12, 2012, 16 pages.

Li, Baichuan et al., "Question Routing in Community Question Answering: Putting Category in Its Place", CIKM'11, Proceedings of the 20th ACM International Conference on Information and Knowledge Management, Oct. 24-28, 2011, 4 pages.

McCord, M.C. et al., "Deep parsing in Watson", IBM J. Res. & Dev. vol. 56 No. 3/4 Paper 3, May/Jul. 2012, pp. 3:1-3:15.

Yuan, Michael J. , "Watson and healthcare, How natural language processing and semantic search could revolutionize clinical decision support", IBM developerWorks, IBM Corporation, Apr. 12, 2011, 14 pages.

IBM, Appendix P, List of IBM Patents or Patent Applications Treated As Related, 2 pages, dated Jul. 11, 2017.

Toh, Huey Ling, "Design of a Low-Cost Adaptive Question Answering System for Closed Domain Factoid Queries", The Florida State University College of Arts and Sciences, Dissertation approved Feb. 26, 2010, UMI 3415249, UMI® Dissertation Publishing, Copyright 2010 by ProQuest LLC, 156 pages.

Wan, et al., "Research on Pretreatment of Questions Based on Large-scale Real Questions Set", Journal of Networks, vol. 8, No. 8, Aug. 2013, pp. 1810-1816, doi: 10.4304/jnw.8.81810-1816.

\* cited by examiner

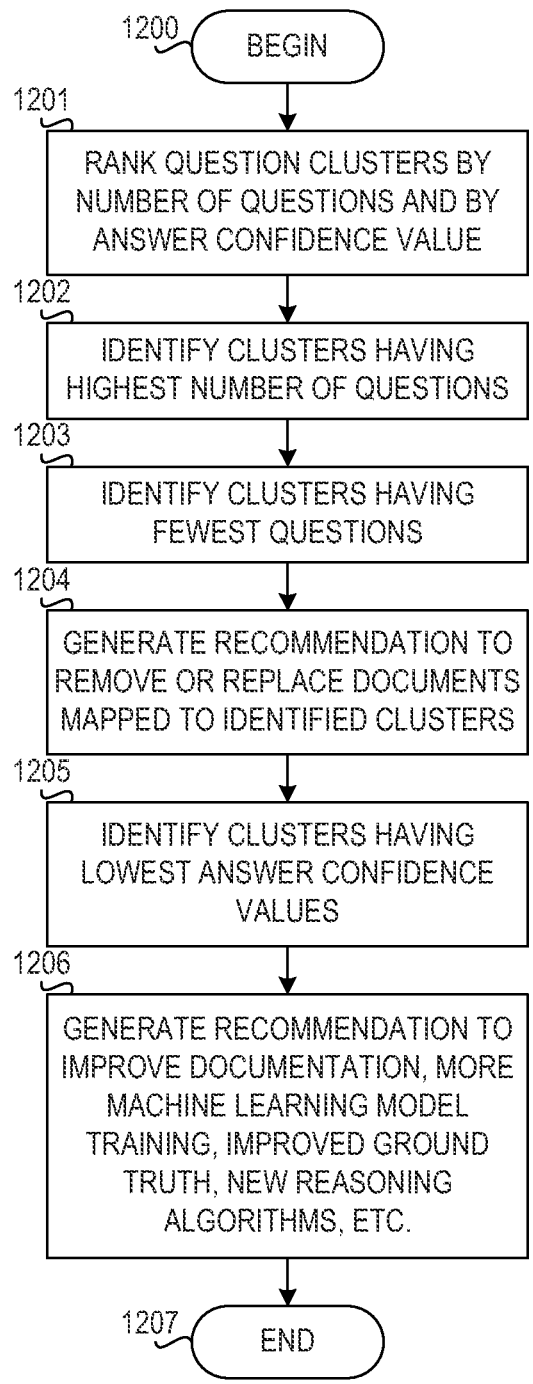

CATEGORIZING QUESTIONS IN A QUESTION ANSWERING SYSTEM

BACKGROUND

The present application relates generally to an improved data processing apparatus and method and more specifically to mechanisms for categorizing questions in a question answering system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana®, from Microsoft®, and the IBM Watson™ system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method, in a data processing system, is provided for categorizing questions. The method comprises clustering documents from a corpus of documents to form a nested structure of clusters of documents. The method further comprises recording questions answered by question answering system in a database in association with answers returned and answer confidence values. The method further comprises mapping the questions to the nested structure of clusters of documents to form a nested structure of clusters of questions. The method further comprises presenting recommended questions based on the nested structure of clusters of questions in a user interface of the question answering system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 12 is a flowchart illustrating operation of a mechanism for generating usage reports based on question categorization in accordance with an illustrative embodiment.

DETAILED DESCRIPTION

Figure 1:
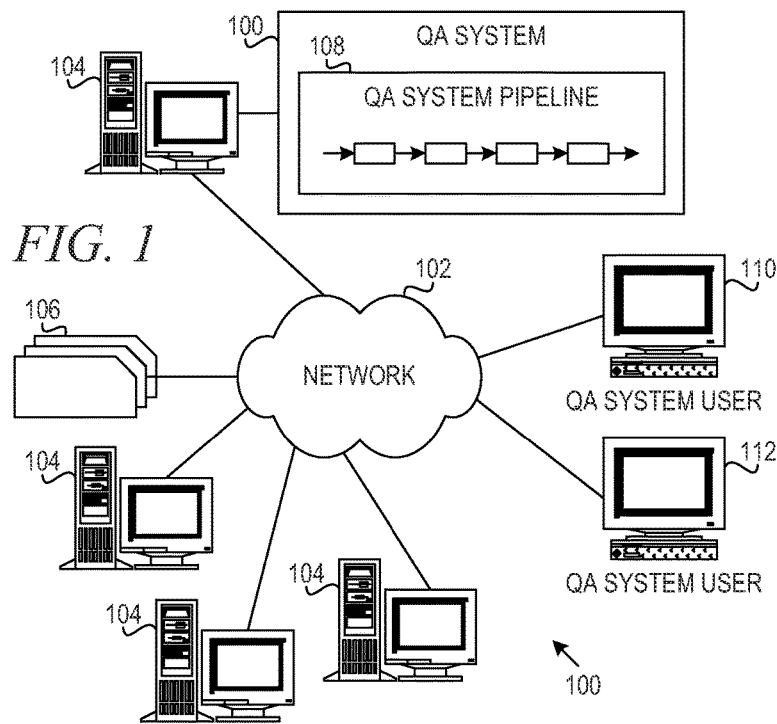
FIG. 1 depicts a schematic diagram of one illustrative embodiment of a question/answer creation (QA) system in a computer network.

The illustrative embodiments provide mechanisms for categorizing questions in a question answering (QA) system. In many applications, QA systems have a large and often diverse corpus to draw on the answer questions. As a result, the questions asked of the system can be completely unrelated, covering many different topics. A corpus may also contain many related but broad topics, which could be broken down into many sub-topics. For example, one may break the topic of mortgages into sub-topics such as first time buyer, selling a home, terms, renewals, etc. All of these topics are related to mortgages; however, one may group each topic at a more granular level.

Although the corpus may contain a vast amount of information, QA systems can only answer questions found in the corpus. Thus, it is important to educate the user about the types of questions the user can ask and the topics about which the user can inquire to ensure the best results. To educate the user about constructing a well-formatted question within the various corpus topics, the mechanisms of the illustrative embodiments present users with a set of previously asked questions, which the user can select for submission or draw inspiration from.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
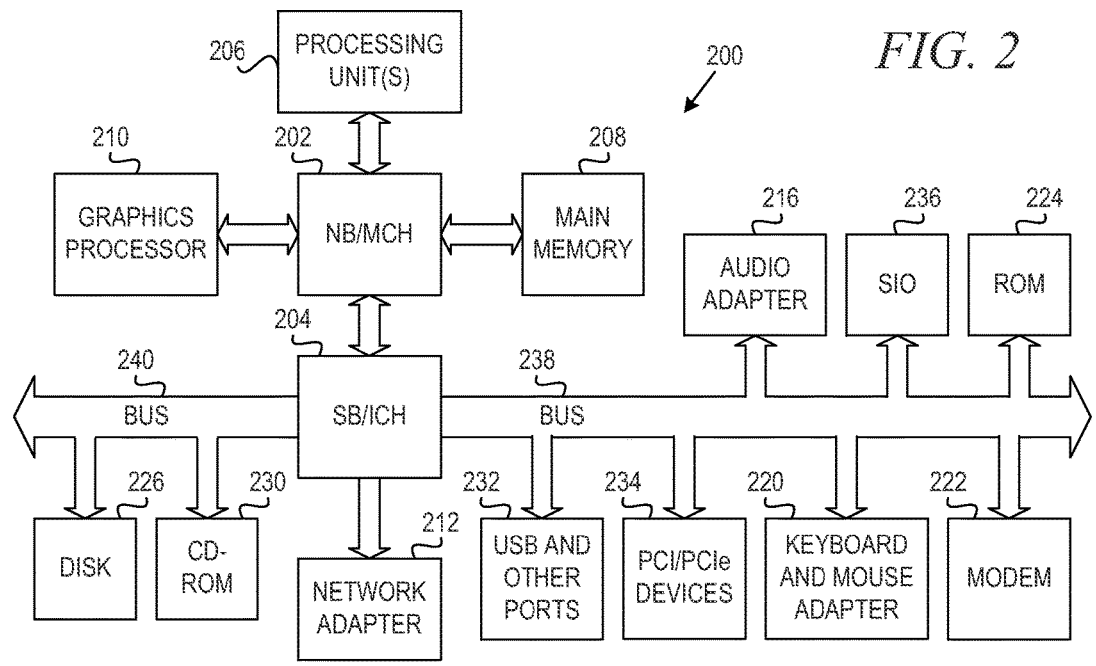
FIG. 2 is a block diagram of an example data processing system in which aspects of the illustrative embodiments are implemented.
Figure 3:
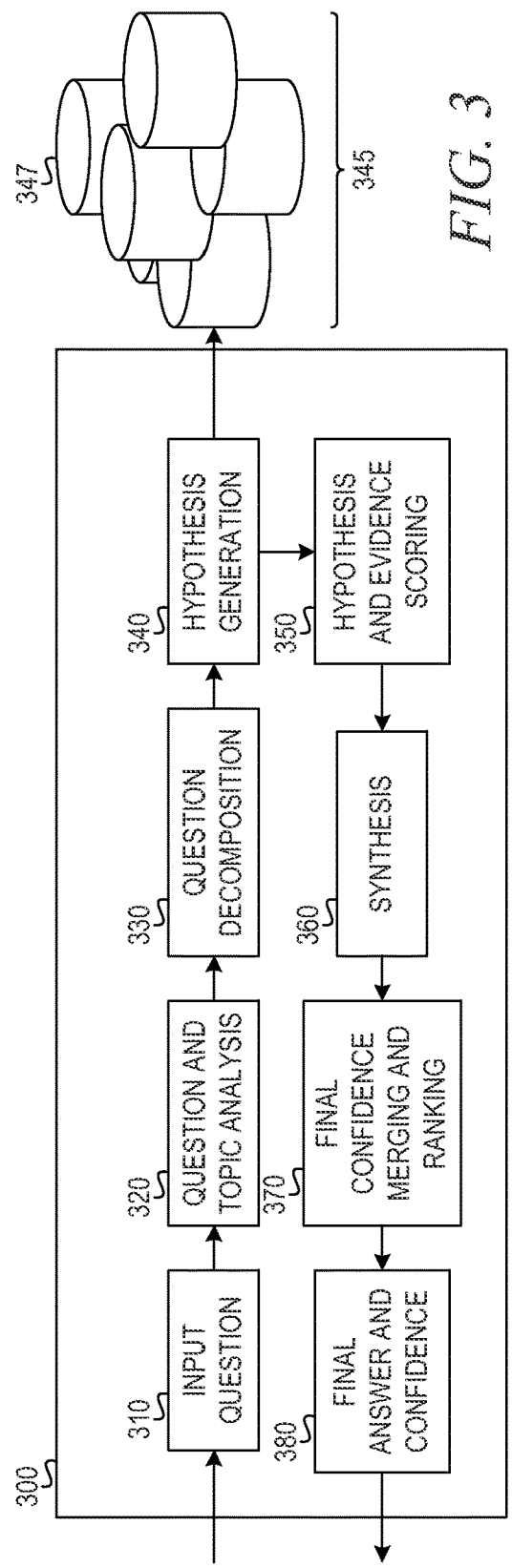
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments are integrated in, augment, and extend the functionality of these QA mechanisms with regard to categorizing questions in a question answering system.

Thus, it is important to first have an understanding of how question and answer creation in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices 110-112. Other embodiments of the QA system 100 may be used with components, systems, sub-systems, and/or devices other than those that are depicted herein.

The QA system 100 is configured to implement a QA system pipeline 108 that receive inputs from various sources. For example, the QA system 100 receives input from the network 102, a corpus of electronic documents 106, QA system users, and/or other data and other possible sources of input. In one embodiment, some or all of the inputs to the QA system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 parses and interprets the question, and provides a response to the QA system user, e.g., QA system user 110, containing one or more answers to the question. In some embodiments, the QA system 100 provides a response to users in a ranked list of candidate answers while in other illustrative embodiments, the QA system 100 provides a single final answer or a combination of a final answer and ranked listing of other candidate answers.

The QA system 100 implements a QA system pipeline 108 which comprises a plurality of stages for processing an input question and the corpus of data 106. The QA system pipeline 108 generates answers for the input question based on the processing of the input question and the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In accordance with an illustrative embodiment, a natural language (NL) processing system, which may be QA system 100 in one embodiment or may run on another one of servers 104, ingests documents into corpus 106. The NL processing system uses a clustering algorithm to categorize the documents in corpus 106 into a nested structure of clusters and sub-clusters. The NL processing system assigns a unique cluster identifier (ID) to each cluster and sub-cluster of documents. Operation of the NL processing system categorizing documents into clusters is described in further detail below with reference to FIG. 4.

In accordance with another illustrative embodiment, as users submit questions via clients 110, 112, QA system 100 tracks the questions asked, the answers returned, the answer confidence values, user feedback given for each answer, etc. into a question history database (DB) (not shown). QA system 100 maps each question submitted by a user to the nested structure of clusters and sub-clusters, i.e., the document categories or topics. QA system 100 then uses a ranking algorithm to display the most relevant questions based on user input from clients 110, 112 and based on answer confidence values, user feedback, question frequency, etc. Thus, QA system 100 programmatically returns a set of recommended questions that are relevant to user input and for which QA system 100 can return high confidence answers. Operation of QA system 100 categorizing questions and providing recommended questions for user selection is described in further detail below with reference to FIG. 5.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

In accordance with the illustrative embodiments, for a given input question 310, final answer and confidence stage 380 of QA system pipeline 300 provides one or more answers to be returned and answer confidence values for storage in a question history database (DB) (not shown). Other stages of QA system pipeline 300 may provide other features to be tracked in the question history DB, such as question type, lexical answer type (LAT) and focus of the question, etc. The question history DB may track other information, such as a session identifier (ID), which answers are shown to the user, whether or not the user viewed supporting evidence for a given answer, user feedback (e.g., thumbs up/down or optional comments), etc. The QA system then uses the information in the question history DB to map questions to a nested structure of clusters of documents, as will be described in further detail below.

Figure 4:
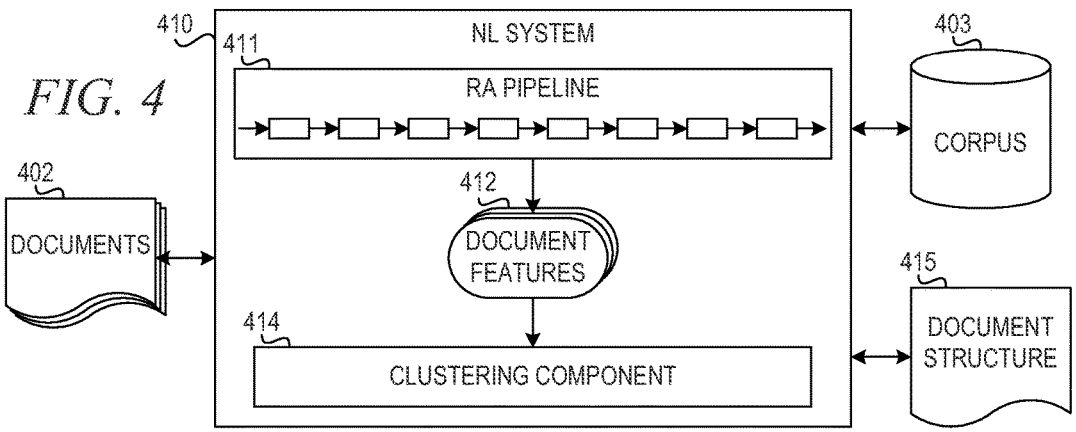
FIG. 4 is a block diagram of a natural language processing system generating a nested structure of clusters of documents in accordance with an illustrative embodiment.

FIG. 4 is a block diagram of a natural language processing system generating a nested structure of clusters of documents in accordance with an illustrative embodiment. Natural language (NL) processing system 410 receives documents 402 to be incorporated into corpus 403. Natural language processing is a field of computer science, artificial intelligence, and linguistics concerned with the interactions between computers and human (natural) languages. As such, NL processing is related to the area of human-computer interaction. Many challenges in NL processing involve natural language understanding, that is, enabling computers to derive meaning from human or natural language input, and others involve natural language generation.

Reasoning algorithm (RA) pipeline 411 parses and analyzes documents 402 and generates document features 412. RA pipeline 410 labels or annotates documents as they are incorporated into corpus 402. Thus, NL system 410 is said to "ingest" documents 402 into corpus 403.

In accordance with the illustrative embodiment, clustering component 414 uses a clustering algorithm to group similar documents into clusters. Cluster analysis or clustering is the task of grouping a set of objects in such a way that objects in the same group (i.e., a cluster) are more similar in some sense or another to each other than to those in other groups (clusters). Clustering is a main task of exploratory data mining, and a common technique for statistical data analysis, used in many fields, including machine learning, pattern recognition, image analysis, information retrieval, and bioinformatics.

In one example embodiment, clustering component 414 uses k-means clustering. The k-means clustering algorithm is a technique of vector quantization, originally from signal processing, that is popular for cluster analysis in data mining. The k-means clustering algorithm aims to partition n observations into k clusters in which each observation belongs to the cluster with the nearest mean, serving as a prototype of the cluster.

Clustering component 414 generates a nested structure 415 of clusters and sub-clusters of documents. Each cluster or sub-cluster has its own cluster ID and a set of documents or document portions categorized in the cluster or sub-cluster. In one example embodiment, document portions may be tree does, each being a section of a larger document. TREC is a known format for breaking down a larger document from the Text REtrieval Conference.

In an alternative embodiment, NL system 410 may cluster previously ingested documents from corpus 403 into the nested structure 415.

Figure 5:
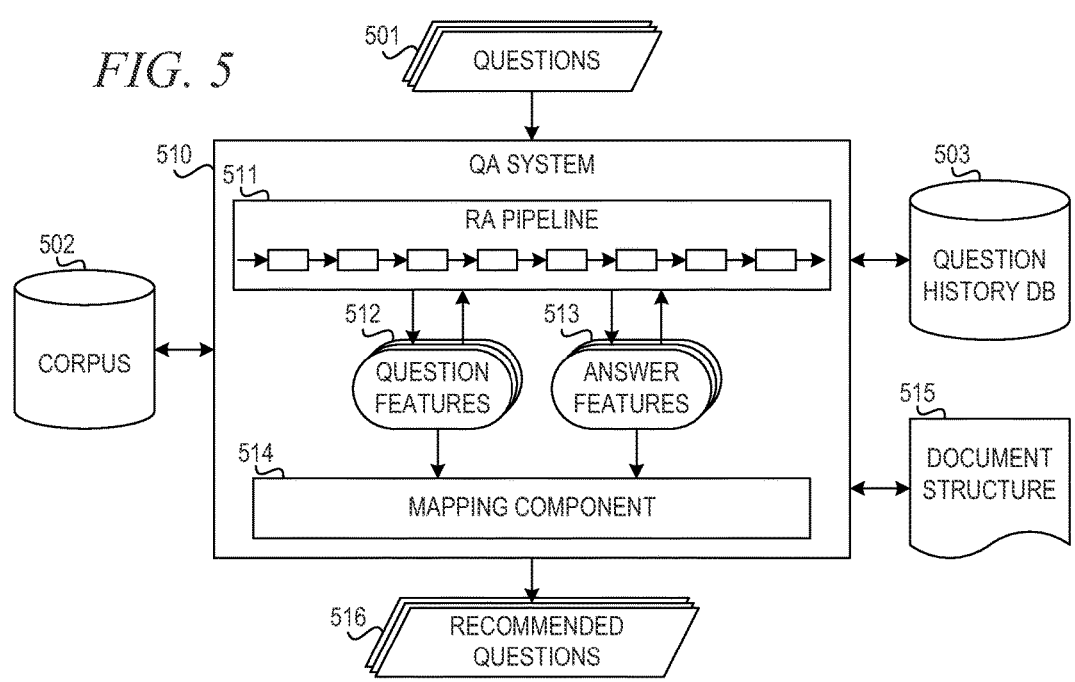
FIG. 5 is a block diagram illustrating a question answering system for categorizing questions and providing question recommendations in accordance with an illustrative embodiment.

FIG. 5 is a block diagram illustrating a question answering system for categorizing questions and providing question recommendations in accordance with an illustrative embodiment. As discussed above with respect to FIGS. 1-3, QA system 510 receives input questions 501 from users and generates candidate answers using supporting evidence in document corpus 502. QA system 510 includes reasoning algorithm (RA) pipeline 511, which generates question features 512 form each input question 501 and answer features 513 from each candidate answer.

In accordance with the illustrative embodiment, QA system 510 tracks information concerning questions asked, question type, LAT and focus of the question, answers returned, answer confidence values, which answers were presented to the user, whether or not the user viewed the supporting evidence for each answer, user feedback for each answer, etc. QA system 510 gathers this information from question features 512 and answer features 513, as well as other sources, such as through the user interface and interaction with the user. QA system 510 stores the tracked information in question history database (DB) 503.

QA system 510 includes mapping component 514, which maps questions 501 to the nested structure of clusters of documents 515. In one embodiment, for a given question, mapping component 514 uses answer features 513 to determine which documents contain supporting evidence for the highest confidence answers. Mapping component 514 may then map the given question to the cluster(s) containing identified documents. A document in this case may be an entire document that was ingested into corpus 502 or individual tree doc post ingestion. Mapping component 514 maps the given question to a very fine level within the corpus. A question may also be a child of more than one cluster or sub-cluster.

In an alternative embodiment, mapping component 514 may use clustering techniques to cluster similar questions prior to mapping the questions to the document clusters. Consider the following questions:

"How do I charge a smartphone using a wall charger?"

"How do I charge my smartphone using my wall charger?"

"Using a smartphone wall charger, how can I charge my phone?"

"How do you use a smartphone wall charger to charge a smartphone?"

In this embodiment, mapping component 514 clusters the above questions into a single group represented by the following question: "How do I charge a smartphone using a wall charger?"

Once mapping component 514 maps questions from question history DB 503 or new questions 501 to the nested structure of clusters 515, QA system 510 assigns labels to the clusters to form question topic or categories. In one example embodiment, QA system 510 allows a subject matter expert to assign labels manually to the cluster IDs. In an alternative embodiment, QA system 510 uses an automated technique for assigning labels.

For a given new question 501, QA system 510 maps the question into an appropriate topic within nested structure of clusters 515. QA system 510 then returns a set of recommended questions 516, which are categorized under the identified topic.

In one example embodiment, QA system 510 ranks the topics (clusters) in nested structure 515 according to various criteria, such as number of questions in each cluster, confidence value for candidate answers, user feedback, and the like. QA system 510 then presents a user interface (not shown) to the user listing the highest ranking topics and sub-topics. In response to the user selecting a topic, QA system 510 presents a set of recommended questions 516 from the selected topic in nested structure of clusters 515.

Figure 6:
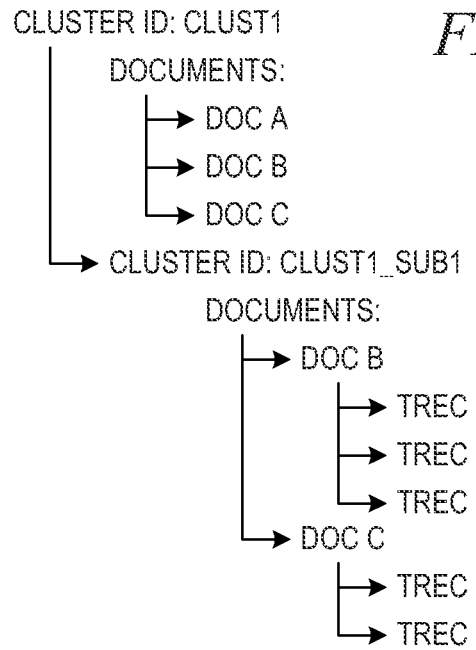
FIG. 6 illustrates an example of a nested structure of clusters and sub-clusters of documents in accordance with an illustrative embodiment.

FIG. 6 illustrates an example of a nested structure of clusters and sub-clusters of documents in accordance with an illustrative embodiment. In the depicted example, the nested structure includes at least one cluster, which has at least one sub-cluster. The cluster has a plurality of documents. The sub-cluster has a plurality of documents, each of which has a plurality of tree does.

Figure 7:
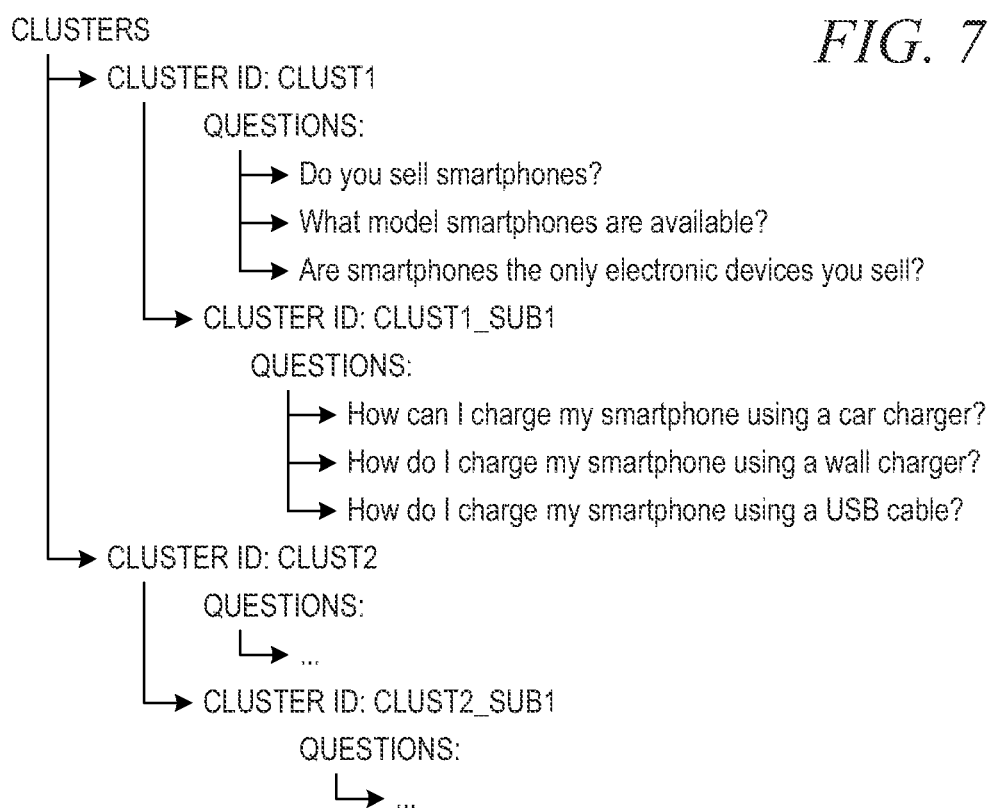
FIG. 7 illustrates an example of a nested structure of clusters and sub-clusters of questions in accordance with an illustrative embodiment.

FIG. 7 illustrates an example of a nested structure of clusters and sub-clusters of questions in accordance with an illustrative embodiment. Clearly, the structure of clusters could potentially end up with many hundreds of topics (clusters) and sub-topics (sub-clusters) in which questions are categorized. The number of questions in each cluster forms a part of the algorithm to determine which clusters to use in the user interface along with the frequency that they are asked. This mechanism gives the QA system the ability to generate the most frequented topics in the corpus. The most frequented or common topics would then be pushed up higher in the user interface, so overall the users are likely to spend less time searching for desired topics. Once the system reaches a predetermined maximum number of categories, everything else falls into the "other" category.

The system may also track individual user behavior. The system then maps the user's question history to question categories, presenting the user with categories most likely to be relevant to the individual user. The system may also map other user context information, which may be provided by third party systems. For example, if a user is logged in using a cell phone provider's Web site, the system may know that the user recently installed a new smartphone operating system upgrade, that the user recently got a new device, the user's cell phone plan, average data usage, etc. The QA system may use this information to help display the most relevant question categories to the user.

Generating this categorization provides a number of benefits from a user interface presentation perspective. First of all, it allows the QA system to give a user a breakdown of broad topics for which the QA system can provide high confidence answers. It also allows the user to view a set of questions related to his or her interest much more quickly. The categorization also allows the capability of presenting many more questions in the user interface itself, because categorizing questions into topics allows the QA system to present a broad range is disparate topics while also presenting a number of questions that are most relevant to the user.

The QA system may also use the mechanisms of the illustrative embodiments for generating typeahead feedback. The QA system presents as broad a range of topics as possible initially and then narrows the typeahead scope as the user provides more context for the question. Having the questions in categories allows the QA system to provide this broad set of questions very easily by taking the top, or more frequently asked, questions in each topic and displaying them in the typeahead feedback.

The mechanisms of the illustrative embodiments also allow the QA system to generate better usage reports. The QA system may show the questions asked per topic and sub-topic. Once the QA system determines the most frequented topics, the QA system can use that information to improve the corpus. If there are certain topics that are never used, the QA system determines that part of the corpus is irrelevant and could be replaced or removed. On the other hand, if there is a particular set of topics for which the questions are consistently ranked and rated poorly, the QA system generates a list of topics that need improved documentation, more training of the models, improved ground truth, new reasoning algorithms, etc. This could also indicate that a set of documents in the corpus may be out of date and should be replaced or updated.

Because the QA system tracks topic usage to a low level, the QA system could potentially look at pieces of certain documents in the corpus that are relevant compared to other pieces of a document that are not relevant. For example, 90% of a year-old smartphone device manual may still be relevant to the latest operating system or device version, but 10% may be outdated. Using the mechanisms of the illustrative embodiments, the QA system can identify the topics in the document that are no longer relevant to the questions being asked and can use that information in answer scoring algorithms to vastly reduce the confidence in answers coming from those sections of that document.

The QA system may use such information to improve answers to related questions. Once the QA system knows a question is roughly mapped to other questions within one of the clusters, the QA system can use that information as part of the ranking algorithm to increase the rank of documents found within that cluster.

Thus, the QA system would give a higher confidence rating to answers from documents within a cluster when the question is similar to other questions associated with that cluster. For example, consider the questions mentioned above:

"How do I charge a smartphone using a wall charger?"

"How do I charge my smartphone using my wall charger?"

"Using a smartphone wall charger, how can I charge my phone?"

"How do you use a smartphone wall charger to charge a smartphone?"

In this embodiment, the QA system knows these questions are mapped to a cluster of documents related to "charging a smartphone." If a user were to ask the question, "I am having trouble charging my smartphone, can you help?" the QA system determines that the question is related to the set of questions associated with the "charging a smartphone" cluster. Because the QA system has determined that the cluster of documents provide high confidence answers for other questions on that topic, it stands to reason that the same cluster would provide high confidence answers for this question. Therefore, the QA system ranks answers generated from the "charging a smartphone" cluster higher than answers from documents in other clusters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
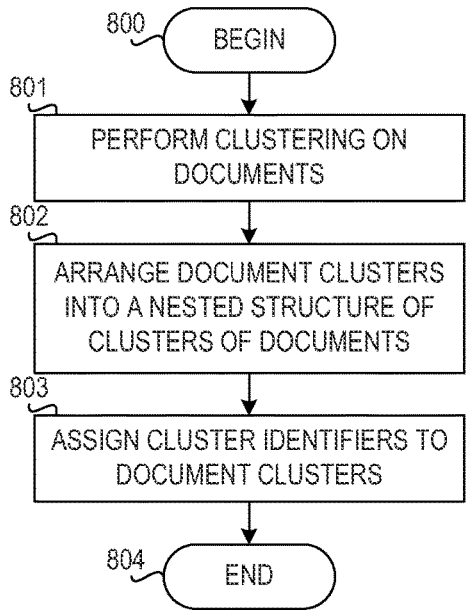
FIG. 8 is a flowchart illustrating operation of a mechanism for generating a nested structure of clusters of documents in accordance with an illustrative embodiment.

FIG. 8 is a flowchart illustrating operation of a mechanism for generating a nested structure of clusters of documents in accordance with an illustrative embodiment. Operation begins (block 800), and the mechanism performs clustering on documents (block 801). The documents may be documents being ingested into a corpus or may be documents in the corpus after ingestion. The documents may be entire documents or portions of documents, such as tree does. The mechanism arranges the document clusters into a nested structure of clusters and sub-clusters of documents (block 802). Then, the mechanism assigns cluster identifiers to the document clusters and sub-clusters (block 803). Thereafter, operation ends (block 804).

Figure 9:
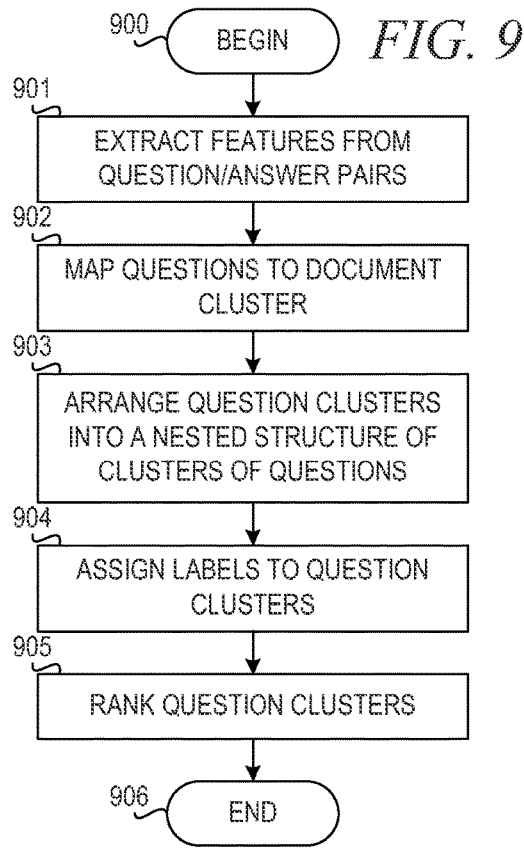
FIG. 9 is a flowchart illustrating operation of a mechanism for mapping questions to a nested structure of clusters in accordance with an illustrative embodiment.

FIG. 9 is a flowchart illustrating operation of a mechanism for mapping questions to a nested structure of clusters in accordance with an illustrative embodiment. Operation begins (block 900), and the mechanism extracts features from question/answer pairs (block 901). The question/answer pairs may be newly asked questions and answers returned. Alternatively, the question/answer pairs may be from a question history database. The features may include features extracted by reasoning algorithms of a QA system, such as question type, LAT, focus, answer confidence value, etc. In one example embodiment, the features may include additional context information, such as session ID, which answers were shown to the user, whether or not the user viewed supporting evidence for each answer, user feedback, etc.

The mechanism maps questions to document clusters (block 902). For each question, the mechanism may map the question based on which documents provide supporting evidence. In one example embodiment, the mechanism may cluster similar questions prior to mapping to a document cluster. Next, the mechanism arranges the question clusters into a nested structure of clusters and sub-clusters of questions (block 903).

The mechanism then assigns labels to question clusters to form descriptive topic labels (block 904). The mechanism may use manual or automated techniques to label the question clusters and sub-clusters. The mechanism ranks the question clusters according to the number of questions asked in each topic, confidence values of answers, and other user context information (block 905). Thereafter, operation ends (block 906).

Figure 10:
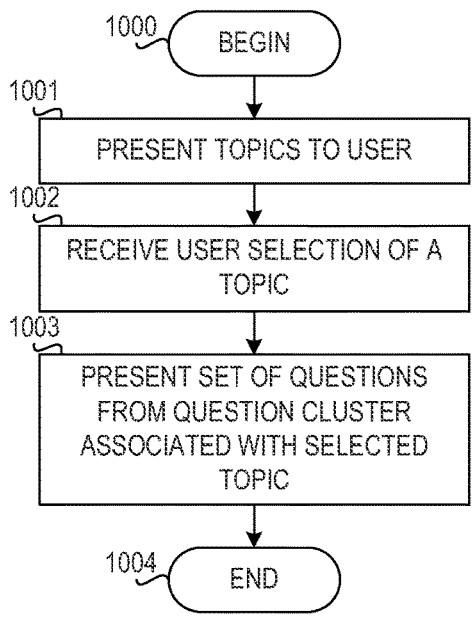
FIG. 10 is a flowchart illustrating operation of a mechanism for presenting question topics to a user in accordance with an illustrative embodiment.

FIG. 10 is a flowchart illustrating operation of a mechanism for presenting question topics to a user in accordance with an illustrative embodiment. Operation begins (block 1000), and the mechanism presents topics to the user in a user interface (block 1001). The mechanism may present the most frequented or highest ranked topics. Alternatively, the mechanism may present topics based on an initial user input or based on user context information from third party systems. The mechanism then receives a user selection of a topic (block 1002). The mechanism presents a set of questions from the question cluster associated with the selected topic (block 1003). Thereafter, operation ends (block 1004).

Figure 11:
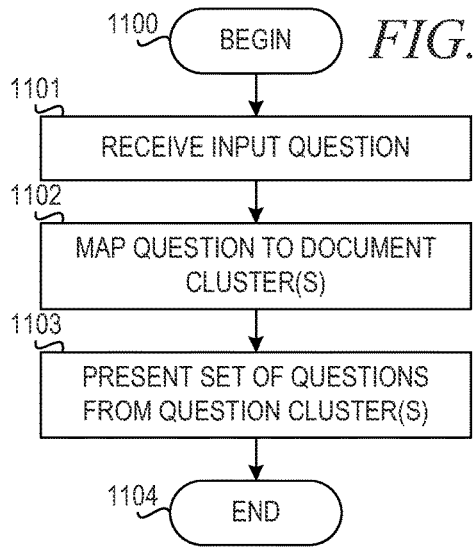
FIG. 11 is a flowchart illustrating operation of a mechanism for presenting recommended questions based on question categorization in accordance with an illustrative embodiment.

FIG. 11 is a flowchart illustrating operation of a mechanism for presenting recommended questions based on question categorization in accordance with an illustrative embodiment. Operation begins (block 1100), and the mechanism receives an input question from the user (block 1101). The mechanism maps the question to a document cluster (block 1102). The mechanism then presents a set of recommended questions from the question cluster(s) (block 1103). Thereafter, operation ends (block 1104).

FIG. 12 is a flowchart illustrating operation of a mechanism for generating usage reports based on question categorization in accordance with an illustrative embodiment. Operation begins (block 1200), and the mechanism ranks the clusters and sub-clusters of questions by number of questions and also by answer confidence value (block 1201). These rankings may result in two separate rankings: one based on number of questions and another based on answer confidence.

The mechanism identifies clusters having highest numbers of questions (block 1202). In one embodiment, the mechanism compares the number of questions in each cluster and sub-cluster with a first predetermined threshold. The mechanism may then list the topics and sub-topics for which the number of questions exceeds the first predetermined threshold. The mechanism may list these identified clusters and sub-clusters in the usage report to inform a user of the most visited topics. The user will likely have specific expectations about which topics have the most asked questions; however, it is possible that the actual usage does not match the user's expectations. For example, the designer of a QA system designed to answer questions about healthcare insurance may expect many questions to be about premiums and deductibles, but the actual usage may also show that many users ask questions about prescription coverage. Knowledge about actual usage of the QA system and the question topics and supporting documents allows a designer to improve and supplement the corpus in the future.

The mechanism identifies clusters having fewest numbers of questions (block 1203). In one embodiment, the mechanism compares the number of questions in each cluster and sub-cluster with a second predetermined threshold. The mechanism may then list the topics and sub-topics for which the number of questions is less than the second predetermined threshold. The mechanism then generates a recommendation to remove or replace documents mapped to the identified clusters (block 1204). Thus, if the designer of a QA system finds that users do not ask questions about particular topics, the designer may remove or replace documents mapped to those topics to free storage space for more useful documents.

The mechanism identifies cluster and sub-clusters having lowest answer confidence values (block 1205). In one embodiment, the mechanism compares a percentage of questions asked in the cluster or sub-cluster for which a high confidence answer was not found to a third threshold. Alternatively, the mechanism compares an average or median answer confidence value for the cluster or sub-cluster to a fourth threshold. Using this information based on actual usage, a designer may determine that the documentation for the identified clusters or sub-clusters is not sufficient. The mechanism then generates a recommendation to improve documentation, provide more machine learning model training, improved ground truth, new reasoning algorithms, etc. for the identified clusters (block 1206).

Thereafter, operation ends (block 1207). Thus, the mechanism provides the capability for a designer to fine tune the corpus to actual usage of the QA system. By clustering documents and questions into clusters or topics, the mechanism identifies the specific parts of the corpus that are serving the users well, the parts that are unnecessary, and the parts that require improvement for answering questions in topics that are of interest to users in an actual use case.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for generating a list of questions that are commonly asked of a question answering system. The QA system has determined that the set of questions have high confidence and highly rated answers. The QA system also has access to documents providing evidentiary support for the answers. Of course, the same question may be asked in many different ways, each of which may have highly rated answers from supporting documents. In this case, the QA system uses a question mapping algorithm to map all those semantically equivalent questions to a single question to display in the user interface. The question that the QA system chooses to display is the question within the set with the answer with the highest confidence value and/or the highest user rating. This question is, in turn, mapped to the set of documents providing high quality answers. The QA system also ranks the documents by their confidence values and user ratings. It is possible that multiple answers for the various question formats come from the same document.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a question answering system, for categorizing questions, the method comprising:
   storing a corpus of documents in a first database;
   clustering documents from the corpus of documents to form a nested structure of clusters of documents;
   recording questions answered by the question answering system in a second database that is different from the first database, wherein the questions are answered using supporting evidence from the corpus of documents, and wherein the questions are recorded in association with answers returned and answer confidence values;
   mapping the questions to the nested structure of clusters of documents to form a nested structure of clusters of questions, wherein the mapping includes, for a given question, determining a document containing supporting evidence for the answer to the question, and mapping the question to a cluster containing the document;
   mapping a question history of a user and context information of the user to the nested structure of clusters of questions;
   ranking the nested structure of clusters of questions based on the mapping of the question history and context information, and on the number of questions in each cluster;
   presenting, in a user interface, one or more topics corresponding to one or more of the highest ranking clusters of questions; and
   responsive to receiving user selection of a topic of the presented one or more topics, presenting recommended questions in the user interface, wherein the recommended questions are mapped to a cluster corresponding to the selected topic.

2. The method of claim 1, wherein clustering the documents comprises performing k-means clustering on the corpus of documents.

3. The method of claim 1, wherein clustering the documents comprises assigning a unique cluster identifier to each cluster of documents.

4. The method of claim 1, wherein mapping the questions comprises assigning a descriptive label to each cluster of questions.

5. The method of claim 1, further comprising:
   responsive to receiving a user input, mapping the user input to a given cluster in the nested structure of clusters of questions; and
   presenting a set of questions mapped to the given cluster in the user interface.

6. The method of claim 1, further comprising:
   responsive to receiving a user input, mapping the user input to a given cluster in the nested structure of clusters of questions;
   generating a type-ahead suggestion output based on a set of questions mapped to the given cluster; and
   presenting the type-ahead suggestion output in the user interface.

7. The method 6, wherein generating the type-ahead suggestion output comprises generating a set of suggested questions based on the user input in a range of topics;
   wherein presenting the commonly asked questions further comprises narrowing the range of topics and modifying the set of suggested questions responsive to receiving subsequent user input.

8. The method of claim 1, further comprising:
   responsive to receiving an input question in the user interface, mapping the input question to a given cluster in the nested structure of clusters of questions;
   generating a set of candidate answers for the input question; and
   providing a higher ranking to candidate answers in the set of candidate answers supported by documents in the given cluster.

9. A computer program product comprising a computer readable storage medium having a computer readable program stored therein, wherein the computer readable program, when executed on a computing device, causes the computing device to:
   store a corpus of documents in a first database;
   cluster documents from the corpus of documents to form a nested structure of clusters of documents;
   record questions answered by the question answering system in a second database that is different from the first database, wherein the questions are answered using supporting evidence from the corpus of documents, and wherein the questions are recorded in association with answers returned and answer confidence values;
   map the questions to the nested structure of clusters of documents to form a nested structure of clusters of questions, wherein the mapping includes, for a given question, determining a document containing supporting evidence for the answer to the question, and mapping the question to a cluster containing the document;
   map a question history of a user and context information of the user to the nested structure of clusters of questions;
   rank the nested structure of clusters of questions based on the mapping of the question history and context information, and on the number of questions in each cluster;
   present, in a user interface, one or more topics corresponding to one or more of the highest ranking clusters of questions; and responsive to receiving user selection of a topic of the presented one or more topics, present recommended questions in the user interface, wherein the recommended questions are mapped to a cluster corresponding to the selected topic.

10. The computer program product of claim 9, further comprising:
responsive to receiving a user input, mapping the user input to a given cluster in the nested structure of clusters of questions; and
presenting a set of questions mapped to the given cluster in the user interface.

11. The computer program product of claim 9, further comprising:
responsive to receiving a user input, mapping the user input to a given cluster in the nested structure of clusters of questions;
generating a type-ahead suggestion output based on a set of questions mapped to the given cluster; and
presenting the type-ahead suggestion output in the user interface.

12. An apparatus comprising:
a processor; and
a memory coupled to the processor, wherein the memory comprises instructions which, when executed by the processor, cause the processor to:
store a corpus of documents in a first database;
cluster documents from the corpus of documents to form a nested structure of clusters of documents;
record questions answered by the question answering system in a second database that is different from the first database, wherein the questions are answered using supporting evidence from the corpus of documents, and wherein the questions are recorded in association with answers returned and answer confidence values;
map the questions to the nested structure of clusters of documents to form a nested structure of clusters of questions, wherein the mapping includes, for a given question, determining a document containing supporting evidence for the answer to the question, and mapping the question to a cluster containing the document;
map a question history of a user and context information of the user to the nested structure of clusters of questions;
rank the nested structure of clusters of questions based on the mapping of the question history and context information, and on the number of questions in each cluster;
present, in a user interface, one or more topics corresponding to one or more of the highest ranking clusters of questions; and
responsive to receiving user selection of a topic of the presented one or more topics, present recommended questions in the user interface, wherein the recommended questions are mapped to a cluster corresponding to the selected topic.

13. The apparatus of claim 12, further comprising:
responsive to receiving a user input, mapping the user input to a given cluster in the nested structure of clusters of questions; and
presenting a set of questions mapped to the given cluster in the user interface.

14. The apparatus of claim 12, further comprising:
responsive to receiving a user input, mapping the user input to a given cluster in the nested structure of clusters of questions;
generating a type-ahead suggestion output based on a set of questions mapped to the given cluster; and
presenting the type-ahead suggestion output in the user interface.

* * * * *